Dec. 4, 1934.  R. F. FIELD  1,983,447

FREQUENCY METER

Filed Nov. 24, 1931  3 Sheets-Sheet 2

Inventor.
Robert F. Field.
by *David Rines*
Atty.

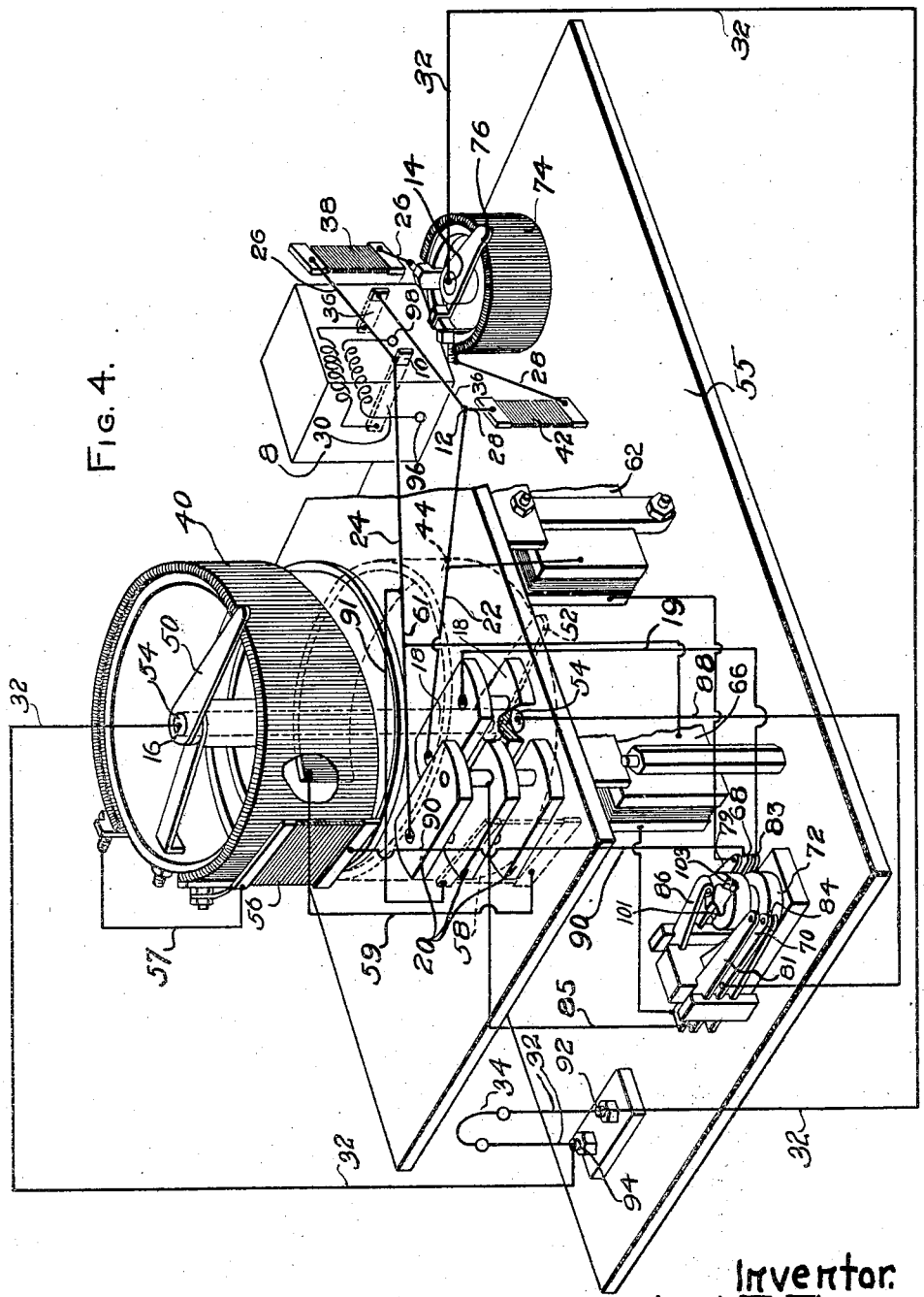

Patented Dec. 4, 1934

1,983,447

UNITED STATES PATENT OFFICE 1,983,447

FREQUENCY METER

Robert Franklin Field, Watertown, Mass., assignor to General Radio Company, Cambridge, Mass., a corporation of Massachusetts Application November 24, 1931, Serial No. 576,987

8 Claims. (Cl. 175—368)

The present invention relates to electric systems and apparatus, and more particularly, to frequency meters, such as audio-frequency meters. The invention is, however, of broader application, and may have other uses, such as a band-elimination filter and harmonic totalizer. For concreteness, all such instruments will be hereinafter designated, in the specification and claims, as frequency meters.

An object of the invention is to provide a new and improved direct-reading, frequency meter.

A further object is to provide a novel frequency meter that shall be simple in construction and easy to operate.

A further object is to provide a new and improved frequency meter that shall have a constant fractional accuracy throughout the scale.

Another object is to provide a new and improved frequency meter that shall have a plurality of ranges, including the usual audio-frequency range and beyond that range in both directions.

Still another object is to provide a new and improved frequency meter the range of any particular scale of which may be varied as desired.

Still a further object is to provide a new and improved frequency meter with the aid of which it shall be possible to measure the frequency with great precision.

Other and further objects will be explained hereinafter and will be particularly pointed out in the appended claims.

Figure 1:
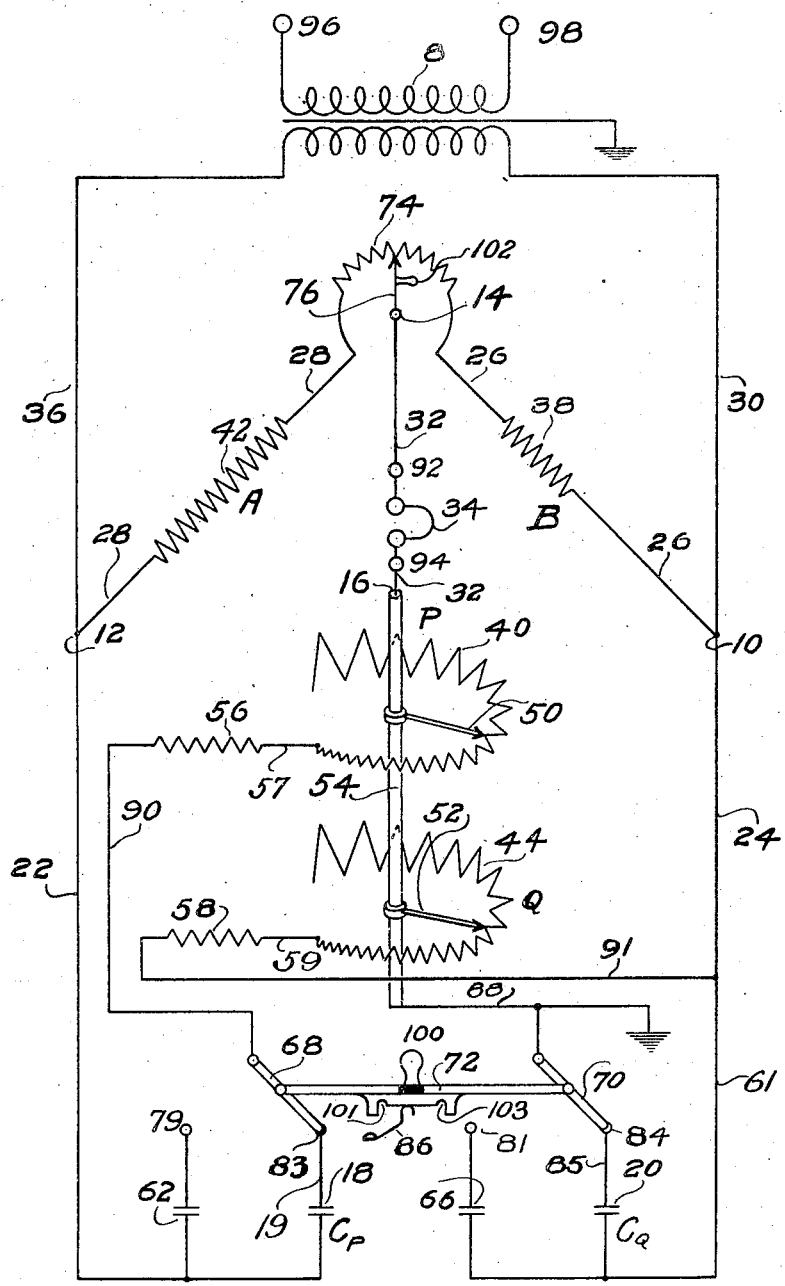
Figure 2:
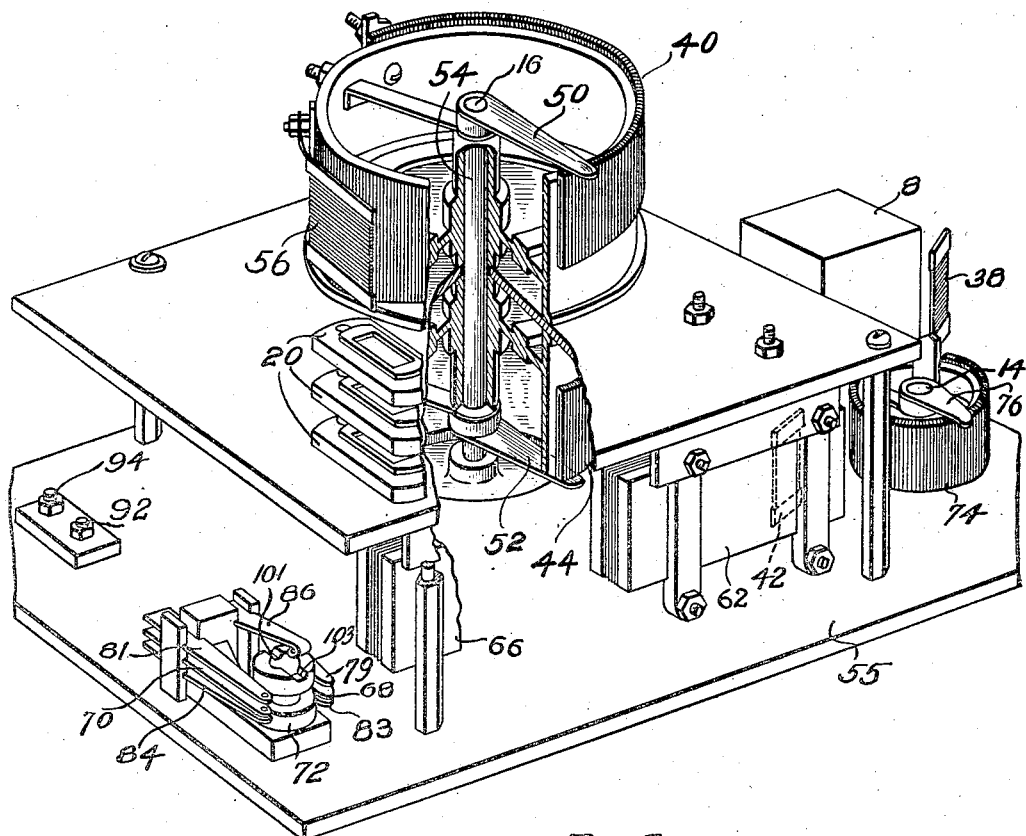
Figure 3:
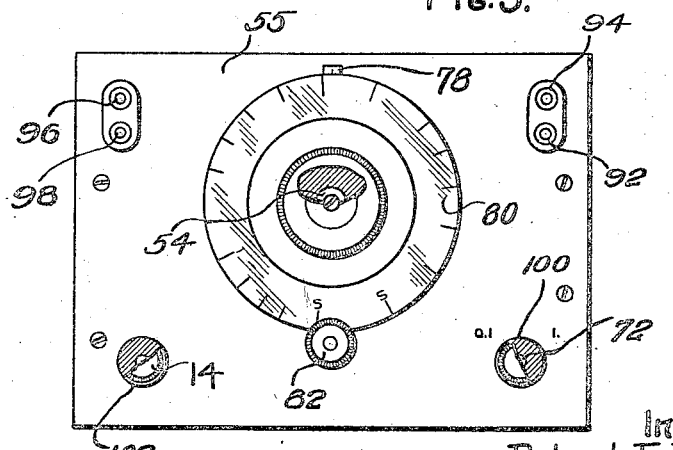

The invention will now be explained more fully in connection with the accompanying drawings, in which Fig. 1 is a simplified circuit diagram of connections; Fig. 2 is a perspective view, with parts broken away, of a preferred embodiment of the present invention; Fig. 3 is a front view of the panel board, upon a smaller scale and with parts broken away; and Fig. 4 is a perspective view similar to Fig. 2, the electrical connections being shown diagrammatically as an aid to an understanding of the connections diagrammatically shown in Fig. 1.

The preferred frequency meter illustrated in the drawings comprises a Wheatstone bridge connected to any desired source of frequency to be measured by an input transformer 8, with a two-to-one, step-down ratio. Two opposite vertices of the bridge are shown at 10 and 12, and the other two at 14 and 16. The bridge is substantially non-inductive, so as to avoid possibilities of magnetic pick-up that might vitiate the measurements. The adjacent ratio arms 26 and 28 of the bridge, furthermore, are substantially non-capacitive, being constituted of substantially pure resistors 38 and 42. The other adjacent arms 22 and 24 are provided with resistors 40 and 44, the former in series with a condenser 18 and the latter in parallel with a condenser 20.

Let A represent the resistance of the arm 28, B represent the resistance of the arm 26, P represent the resistance of the resistor 40, Q represent the resistance of the resistor 44, $C_P$ represent the capacitance of the condenser 18, and $C_Q$ represent the capacitance of the condenser 20. It is desirable to include in P and Q the respective resistances of fixed, or constant, resistors 56 and 58, hereinafter described more fully. Further, let $f$ represent the frequency, $$\omega = 2\pi f, \text{ and } j = \sqrt{-1}.$$

Then the condition for the balance of the bridge is $$\frac{A}{B} = \frac{P + \frac{1}{j\omega C_P}}{\frac{1}{\frac{1}{Q} + j\omega C_Q}}$$

The two equations obtained by separating out the real and the imaginary parts of this equation are:

$$1 - \omega^2 PQ C_P C_Q = 0$$

$$C_P(AQ - BP) = B C_Q Q$$

The frequency will be given by the formula $$f = \frac{1}{2\pi\sqrt{PQ C_P C_Q}}; \qquad (1)$$

the other condition for balance being $$\frac{C_Q}{C_P} = \frac{A}{B} - \frac{P}{Q} \qquad (2)$$

In designing the frequency meter of the present invention, the various impedances are so chosen that Equation (2) is always satisfied. The preferred way is to have the capacitances $C_P$ and $C_Q$ of the series-connected condenser 18 and the parallel-connected condenser 20 equal; the resistances P and Q of the resistors 40 and 56, in series, and the resistors 44 and 58, in series, likewise equal; and the resistance A of the resistor 42 equal to double the resistance B of the resistor 38. The frequency Equation (1) then reduces to $$f = \frac{1}{2\pi P C_P}$$

To measure different frequencies conveniently with this instrument, therefore, all that is necessary is to have the capacitances $C_P$ and $C_Q$ and the resistors A and B fixed, and of the above relative values, and so to adjust the variable resistors 40 and 44 that the frequency Equation (1) is satisfied, while at the same time their effective resistances shall always be equal. This may readily be effected by having the resistors 40 and 44 identical in construction, mounted upon the surface of a common cylinder, and simultaneously adjusting them in any desired manner, as by means of contact arms 50 and 52 rotatable with a common shaft 54 mounted on a panel 55. The resistors 40 and 44, shown in Figs. 2 and 4 as continuous single arms, are continuously varied by the contact arms 50 and 52, as they are rotated about the axis of the shaft 54.

Tracing the circuits diagrammatically indicated in Figs. 1 and 4, current travels from one side of the secondary winding of the transformer 8, by way of a conductor 30, to the bridge vertex 10; and from the other side of the secondary winding of the transformer 8, by way of a conductor 36, to the bridge vertex 12. From the bridge vertex 10, the current travels along the two arms 26 and 24; and from the bridge vertex 12, along the two arms 28 and 22.

The arm 26 comprises the resistor 38 and extends to the bridge vertex 14, through part of a small resistor or potentiometer 74, hereinafter more fully described. The arm 28, similarly, comprises the resistor 42, and extends to the same vertex 14. The arm 24 contains two parallel branches. One of these branches comprises a conductor 91, the fixed or constant resistor 58, a conductor 59, the resistor 44 and the resistor contact arm 52 that is electrically connected with, and mechanically secured to, the shaft 54. The other branch contains a conductor 61, the parallel condenser 20, a conductor 85, a contact member 84, a switch member 70 in contact therewith, and a conductor 88, to the same shaft 54. The shaft 54 is electrically connected with the bridge vertex 16. The arm 22 comprises the series condenser 18, a conductor 19, a contact member 83, a switch member 68 in contact therewith, a conductor 90, the fixed or constant resistor 56, a conductor 57, the resistor 40, and the resistor contact arm 50 that is electrically connected with, and mechanically secured to, the same shaft 54. The purposes of the resistors 56 and 58, and of the switch members 68 and 70, will be explained hereinafter.

The bridge vertices 14 and 16 are bridged by a conductor 32 having a telephone or other null detector 34. The point of balance for the successive adjustments is indicated by a zero voltage difference between the vertices 14 and 16, which difference is discernible, at audio frequencies, by silence, or no current, in the telephone 34. Power from the line may be supplied to the transformer 8 by plugging in at the input-terminal sockets 96, 98. The telephones 34 may similarly be connected by means of plugs inserted in sockets 92, 94.

An indicator 78 indicates directly the exact frequency on a frequency scale 80 that is mounted on the shaft 54 so as to rotate therewith. The scale 80 may be of any desired character. The resistors 40 and 44 are preferably so proportioned and tapered, however, that the frequency scale 80 is logarithmic with respect to angular movement of the shaft 54, thus providing for a constant fractional or constant-percentage accuracy of reading over the entire length. The exact taper of the resistors 40 and 44 may be computed by competent mathematicians, or determined by experiment.

The scale 80 may, in practice, be engraved on a six-inch dial, having an angular movement of about 320° and a length of about seventeen inches. The graduations may be so chosen that one division represents between one and two per cent of the reading at that point. The length of one division may vary from $\frac{1}{16}$ to $\frac{1}{8}$ inch so that 0.2 per cent may be easily estimated. If the size of wire used on the variable resistors 40 and 44 is such that there are 160 turns per inch, an accuracy of setting of about 0.1 per cent may be attained. It is found, in practice, that, with a pure wave form, and either sufficient input voltage or sufficient output amplification, the change of a single wire or 0.1 per cent, may be easily detected, particularly if the resistance balance potentiometer 74 is employed.

The impedances A and B of the resistors 42 and 38 may be, respectively, 2000 and 1000 ohms, and that of the potentiometer 74, 25 ohms. The capacitance of the condensers 18 and 20 may be 0.02 microfarads and that of the condensers 62 and 66, 0.2 microfarads. The total resistance of the resistors 40 and 44 may be about 8000 ohms. The resistance of the resistors 56 and 58 may be 750 ohms.

If high enough voltages are not available, an amplifier may be used, preferably connected to the output terminals.

The fixed or constant additional resistors 56 and 58 are respectively connected in series with the variable resistors 40 and 44 of the arms 22 and 24, respectively, to limit the frequency range to a ratio of 10 to 1, with a reasonable overlap on both ends. The resistors 56 and 58 are disposed near the small ends of the resistors 40 and 44, so as constantly to be in circuit. The frequency range may be changed through any desired ratio, say 10 to 1, by substituting, for the series-connected condenser 18, any of a plurality of other condensers, one being shown at 62; and by substituting, simultaneously therewith, for the parallel-connected condenser 20, any of a plurality of other condensers, one being illustrated at 66. The condensers are arranged in pairs:—one pair is constituted of the series-connected condenser 18 and the parallel-connected condenser 20; and another pair of the series-connected condenser 62 and the parallel-connected condenser 66; a third, a fourth and other additional pair of series-connected and parallel-connected condensers may also be provided, if desired. The condensers of each pair will preferably have equal capacitances, as values above indicated, and they will be connected into and out of the circuits of the respective bridge arms 22 and 24 simultaneously.

The use of these different-sized condensers to provide different frequency ranges will be understood from the fact that, though the capacitances $C_P$ and $C_Q$ may be made equal for any particular range, they may each be ten times the capacitance employed for a different range. In this manner, the meter may be given a frequency range from 100 to 10,000 cycles per second in two steps; or it may cover the frequency range from 20 to 20,000 cycles per second in three steps.

The simultaneous connecting of the condensers into and out of circuit is diagrammatically illustrated in Fig. 1 as effected by means of the switches 68 and 70, connected by an insulating member 72 so as to move together. They are thus adapted to contact simultaneously with contact members 83 and 84, so as to connect the condensers 18 and 20 into circuit, or with contact members 79 and 81, so as to connect the condensers 62 and 66 into circuit. In Fig. 2, the insulating member 72 is shown as a rotatable cam shaft. The contact members 81 and 84 are shown as contact spring arms, disposed at one side of the insulating cam shaft 72, between which is another contact spring arm 70; and the contact members 79 and 83 are similarly shown as contact spring arms, disposed at the opposite side of the insulating cam shaft 72, between which is the contact spring arm 68.

Rotation of the cam shaft 72 in one direction by means of a knob 100 on the other side of the panel will cause simultaneously the spring arm 68 to engage the spring arm 83, and the spring arm 70 to engage the spring arm 84. Rotation of the cam shaft 72 in the opposite direction will similarly cause simultaneous engagement of the spring arm 68 with the spring arm 79 and of the spring arm 70 with the spring arm 81. A spring catch 86 engages a recess 101 in the cam shaft 72 to limit the rotative movement of the cam shaft in one direction and engages a recess 103 in the cam shaft to limit the rotative movement of the cam shaft in the opposite direction.

It is thus possible to use the same scale 80 for all frequency ranges, with decimal multiplying factors.

It will be noted that the above Equation (2) for balance is independent of frequency. If, therefore, it is not exactly satisfied, as may be the case for a new adjustment, the setting of the dial 78 for balance is not altered, but it may be dulled and made more difficult to attain. This may occur, during any one frequency range, either because the two variable resistances 40 and 44 are not identical, allowing their ratio $$\frac{P}{Q}$$

to deviate from unity, or because the ratio of the two condensers $C_P$, $C_Q$ is not unity, even though their product is such as to fit the frequency scale engraved on the dial. These slight variations are compensated for by inserting the small potentiometer 74 between the two ratio arms 26 and 28 and connecting the lead 32 from the null detector 34 to its contact arm 76. The resistor 74 is rendered adjustable by means of the contact arm 76, so as to cause the insertion of any desired portion thereof in one of the arms 26 and 28, and the remainder in the other arm. A slow-motion knob 82 of the friction type may be provided for the precise adjustment of balance.

To eliminate the effect of unbalanced capacitances to ground of the source of frequency, the transformer 8 may have a grounded shield between the primary and secondary windings. The input impedance of the bridge itself is that of the ratio arms in series, shunted by the other two arms. The load presented to the frequency source varies from 3 to about 10 kΩ. The output impedance varies between 1 and 4 kΩ. Both depend upon the scale setting, being smallest at the high frequency end.

Any bridge, which, by virtue of the fact that at least one of its balance conditions contains a frequency term, may be used to measure frequency, can be balanced for only one frequency at a time. When balanced for the fundamental of a complex wave form, it is not balanced for the various harmonics. These all appear at the output terminals, but slightly attenuated, and not only make the balance point broad, but shift it to the high frequency side. This difficulty may be overcome either by providing a null detector tuned to the fundamental or by inserting a low pass filter which attenuates all the harmonics. The human ear discriminates between the fundamental and its harmonics to a remarkable extent. At frequencies above the natural frequency of head telephones, which is usually between 800 and 1,000 cycles per second, their decreasing sensitivity as the frequency is increased, makes their use very satisfactory. Below their natural frequency their decreasing sensitivity accentuates the lower and usually stronger harmonics. At a frequency of ½ or ⅓ their natural frequency they strengthen the second or third harmonic to such a degree as to render their use impossible without the addition of a tuned circuit or filter. These considerations set the frequency limits of head telephones at from 300 to 10,000 cycles except when the harmonic content of the source is negligible. Outside of these limits a sensitive high resistance voltmeter may be used with a tuned circuit or filter.

As previously stated, this instrument has also other applications. When connected to a source of complex wave form and balanced for the fundamental frequency, that frequency is completely eliminated from the output. The remaining voltage is due to the harmonics, for a balance at the fundamental frequency does not necessarily mean a balance at the harmonics also. The ratio of this harmonic voltage to fundamental voltage may be found approximately by measuring the input voltage with a suitable voltmeter, and noting the harmonic output voltage. The indicator 78 of the frequency meter is then set to the second harmonic and the input voltage found which will produce the same output voltage. The ratio of the latter input voltage to the former is the ratio of the total harmonic content to the fundamental, on the assumption that it is all second harmonic. The hum voltage from a rectified and filtered direct-current supply may be thus analyzed for the fundamental and second harmonic of the alternating-current supply and the effectiveness of the full wave rectifier studied.

It will be understood, as before stated, that the term "frequency meter" is employed in the specification and claims in this broad sense.

In accordance with the requirements of the statutes, a preferred embodiment of the invention has been illustrated and described herein, but it will be understood that the invention is not restricted to the exact illustrative embodiment. It is desired, therefore, that the appended claims be broadly construed, except insofar as limitations may be made necessary by the state of the prior art.

What is claimed is:

1. A frequency meter comprising a substantially non-inductive Wheatstone bridge having two adjacent substantially non-capacitive arms each having a resistor, a third and a fourth arm each having a resistor, a plurality of pairs of capacitors, means for connecting one capacitor of any pair in series with the resistor of the third arm and the other capacitor of the said pair in parallel with the resistor of the fourth arm, a constant additional resistor in each of the third and fourth arms for limiting the frequency range, means for simultaneously adjusting the resistors in the third and fourth arms to maintain the ratio of their effective resistances substantially constant, a resistor connecting the resistors in the said two adjacent arms, and means for connecting any desired portion of the last-named resistor in one of the said two adjacent arms and the remainder of the said last-named resistor in the other of the said two adjacent arms to adjust the effective values of the resistors in the said two adjacent arms.

2. A frequency meter comprising a substantially non-inductive Wheatstone bridge having two adjacent substantially non-capacitive arms each having a resistor, a third arm having a resistor and a capacitor in series, a fourth arm having a resistor and a capacitor in parallel, means for simultaneously adjusting the resistors in the third and fourth arms, an indicator and a cooperating scale one of which is carried by the adjusting means, the scale having a predetermined range of movement, and means for adjusting the Wheatstone bridge to vary the significance of the indications of the indicator on the scale.

3. A frequency meter comprising a substantially non-inductive Wheatstone bridge having two adjacent substantially non-capacitive arms each having a resistor, means for adjusting the effective values of the resistors, a third and a fourth arm each having a resistor, a plurality of pairs of capacitors, means for connecting one capacitor of any pair in series with the resistor of the third arm and the other capacitor of the said pair in parallel with the resistor of the fourth arm, a constant additional resistor in each of the third and fourth arms for limiting the frequency range, angularly movable means for simultaneously adjusting the resistors in the third and fourth arms to maintain the ratio of their effective resistances substantially constant, and an indicator and a cooperating scale one of which is carried by the adjusting means, the resistors in the third and fourth arms being so proportioned that the scale is logarithmic with respect to angular movement of the adjusting means, the scale having a predetermined range of angular movement relative to the indicator, and the indications of the indicator on the scale having different significance in accordance with the pair of capacitors connected in circuit.

4. A frequency meter comprising a panel, two constant resistors mounted on the panel, two continuously variable, one-arm resistors mounted on the panel along the surface of a cylinder, means for connecting the resistors into a Wheatstone bridge with the constant resistors in two adjacent arms and the continuously variable one-arm resistors in the other two arms, a plurality of pairs of constant condensers mounted on the panel, means for connecting one condenser of any pair in series with one of the variable resistors and the other condenser of the said pair in parallel with the other variable resistor, a shaft mounted on the panel, two contact arms for continuously varying the respective variable resistors mounted on the shaft, the construction and arrangement being such that the movement of the contact arms shall cause the ratio of the effective resistance of the variable resistors to be maintained substantially constant, means for turning the shaft, and an indicator and a cooperating scale one of which is actuated by the shaft, the scale having a predetermined range of movement relative to the indicator, and the indications of the indicator on the scale having different significance in accordance with the pair of capacitances connected in circuit.

5. A frequency meter comprising a substantially non-inductive Wheatstone bridge having two adjacent substantially non-capacitive arms each having a resistor, a third and a fourth arm each having a resistor, a plurality of pairs of capacitors, means for connecting one capacitor of any pair in series with the resistor of the third arm and the other capacitor of the said pair in parallel with the resistor of the fourth arm, means for simultaneously adjusting the resistors in the third and fourth arms to maintain the ratio of their resistances substantially constant, and means for simultaneously adjusting the effective resistances of the said two adjacent arms to compensate for the lack of constancy of the ratio of the resistances of the third and fourth arms.

6. A frequency meter comprising a substantially non-inductive Wheatstone bridge having two adjacent substantially non-capacitive arms each having a resistor, a third arm having a resistor and a capacitor in series, a fourth arm having a resistor and capacitor in parallel, means for simultaneously adjusting the resistors in the third and fourth arms to maintain the ratio of their resistances substantially constant, a resistor connecting the resistors in the said two adjacent arms, and means for connecting any desired portion of the last-named resistor in one of the said two adjacent arms and the remainder of the said last-named resistor in the other of the said two adjacent arms to adjust the effective values of the resistors in the said two adjacent arms.

7. A frequency meter comprising a substantially non-inductive Wheatstone bridge having two adjacent substantially non-capacitive arms each having a resistor, a third arm having a resistor and a capacitor in series, a fourth arm having a resistor and a capacitor in parallel, means for simultaneously adjusting the resistors in the third and fourth arms to maintain the ratio of their resistances substantially constant, means for simultaneously adjusting the effective resistances of the said two adjacent arms to compensate for the lack of constancy of the ratio of the resistances of the third and fourth arms, an indicator and a cooperating scale, one of which is carried by the adjusting means, and means for adjusting the Wheatstone bridge to vary the significance of the indications of the indicator on the scale.

8. A frequency meter comprising a substantially non-inductive Wheatstone bridge having two adjacent substantially non-capacitive arms each having a resistor, a third arm having a resistor and a capacitor in series, a fourth arm having a resistor and a capacitor in parallel, means for simultaneously adjusting the resistors in the third and fourth arms to maintain the ratio of their resistances substantially constant, and means for simultaneously adjusting the effective resistances of the said two adjacent arms to compensate for the lack of constancy of the ratio of the resistances of the third and fourth arms.

ROBERT F. FIELD.